US010660069B2

(12) United States Patent
Kobayashi et al.

(10) Patent No.: US 10,660,069 B2
(45) Date of Patent: May 19, 2020

(54) RESOURCE ALLOCATION DEVICE AND RESOURCE ALLOCATION METHOD

(71) Applicant: NIPPON TELEGRAPH AND TELEPHONE CORPORATION, Chiyoda-ku (JP)

(72) Inventors: Masahiro Kobayashi, Musashino (JP); Toshiaki Tsuchiya, Musashino (JP); Ryutaro Matsumura, Musashino (JP); Takumi Kimura, Musashino (JP); Katsunori Noritake, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/760,282

(22) PCT Filed: Nov. 7, 2016

(86) PCT No.: PCT/JP2016/082918
§ 371 (c)(1),
(2) Date: Mar. 15, 2018

(87) PCT Pub. No.: WO2017/082185
PCT Pub. Date: May 18, 2017

(65) Prior Publication Data
US 2018/0279261 A1 Sep. 27, 2018

(30) Foreign Application Priority Data
Nov. 13, 2015 (JP) ................................ 2015-222640

(51) Int. Cl.
*H04W 72/04* (2009.01)
*H04W 40/04* (2009.01)
*H04L 12/913* (2013.01)

(52) U.S. Cl.
CPC ........... *H04W 72/04* (2013.01); *H04L 47/724* (2013.01); *H04W 40/04* (2013.01)

(58) Field of Classification Search
CPC ...... H04L 47/724; H04W 40/04; H04W 72/04
See application file for complete search history.

(56) References Cited

U.S. PATENT DOCUMENTS 6,580,721 B1 * 6/2003 Beshai ................... H04L 47/10
370/395.2
7,280,481 B2 * 10/2007 Rong ...................... H04L 45/12
370/238

(Continued)

FOREIGN PATENT DOCUMENTS

| JP | 2007-74564 A | 3/2007 |
| JP | 2011-4294 A | 1/2011 |

(Continued)

OTHER PUBLICATIONS

International Search Report dated Jan. 24, 2017 in PCT/JP2016/082918 filed Nov. 7, 2016.

(Continued)

*Primary Examiner* — Stephen J Clawson
(74) *Attorney, Agent, or Firm* — Oblon, McClelland, Maier & Neustadt, L.L.P.

(57) ABSTRACT

A resource allocation device is provided that, responsive to a use request for resources of a network, the use request having a pair of nodes as terminal points designated among a plurality of nodes constituting the network, searches for one or more candidate paths between the terminal points, with which amounts of the resources related to the use request can be allocated, in a state where the resources that have been allocated to one or more other use requests are set aside from the network. The device calculates, for each of the one or more searched-for-candidate paths, in a state where the resources are allocated to the candidate path, a (Continued)

maximum number of paths that can be allocated between the terminal points of a virtual path related to the service, and selects the candidate path with which a sum total of the maximum numbers of paths becomes greatest.

7 Claims, 11 Drawing Sheets

(56) References Cited

U.S. PATENT DOCUMENTS

| | | |
|---|---|---|
| 2002/0018264 A1 | 2/2002 | Kodialam et al. |
| 2003/0214938 A1 | 11/2003 | Jindal et al. |
| 2004/0042398 A1* | 3/2004 | Peleg ............... H04L 47/11 370/230 |
| 2004/0228323 A1 | 11/2004 | Acharya et al. |
| 2007/0066315 A1 | 3/2007 | Kado |
| 2011/0145380 A1* | 6/2011 | Glikson ............ G06F 9/4856 709/223 |
| 2011/0228731 A1* | 9/2011 | Luo .................. H01Q 3/2605 370/329 |
| 2015/0350025 A1 | 12/2015 | Kadohata et al. |
| 2017/0188375 A1* | 6/2017 | Seo .................. H04W 72/02 |

FOREIGN PATENT DOCUMENTS

| | | |
|---|---|---|
| JP | 2014/171056 A | 9/2014 |
| WO | 2014/119724 A1 | 8/2014 |

OTHER PUBLICATIONS

Kar, K. et al., "Minimum Interference Routing of Bandwidth Guaranteed Tunnels with MPLS Traffic Engineering Applications", IEEE Journal on Selected Areas in Communications, Dec. 2000, vol. 18, No. 12, pp. 2566-2579.

Yu, M. et al., "Rethinking Virtual Network Embedding: Substrate Support for Path Splitting and Migration", Computer Communication Review, Apr. 2008, 9 total pages.

Chowdhury, M. et al., "ViNEYard: Virtual Network Embedding Algorithms With Coordinated Node and Link Mapping", IEEE/ACM Transactions on Networking, Feb. 2012, vol. 20, No. 1, pp. 206-219.

* cited by examiner

US 10,660,069 B2

RESOURCE ALLOCATION DEVICE AND RESOURCE ALLOCATION METHOD

TECHNICAL FIELD

The present invention relates to a resource allocation device and a resource allocation method.

BACKGROUND ART

Progress of virtualization technologies has extended applicability of the virtualization technologies not only in the field of cloud computing but also in the field of communication networks. For example, the 5th generation mobile communication networks conceptualize flexible network control by application of the virtualization technologies. In virtualization of communication networks, the NFV (Network Functions Virtualization) technology enables to provide service functions of a communication service provider as software on general-purpose servers, which have conventionally been implemented by dedicated hardware such as routers and gateways. Therefore, a service function becomes executable on any server that exists on the network. Also, the SFC (Service Function Chaining) technology enables to transmit a packet flow of a user to a designated service function in a designated order, and thereby, enables to readily combine service functions. By utilizing these virtualization technologies, a service provider can provide flexible services by readily utilizing network resources and service functions prepared in advance on a communication network.

Meanwhile, a network provider who carries out operational management of such a communication network allocates network resources of its own to a service based on a request from a service provider. In order to raise investment efficiency of facilities, it is important for the network provider to hold as many services as possible on the invested physical network resources.

Allocation of physical network resources to requested services is called "VNE (Virtual Network Embedding) problem", on which a significant number of researches have been reported in recent years (e.g., Non-patent document 1, Non-patent document 2, Patent document 1, etc.). The VNE problem is a problem of allocating physical network resources to services such that requirements of the services are satisfied, in which a given physical network is modeled as a weighted, undirected graph. A physical network is constituted with transfer nodes represented by routers, service nodes to execute service functions, and links that connect these nodes. Service nodes are assumed to be scattered all over the network rather than located in an aggregated site such as a cloud. Among various resource allocation policies that have been proposed, the most frequently used one is minimization of resource usage. In terms of physical resources to be allocated, it is often the case that the link bandwidth between transfer nodes, the CPU, memory, and storage of a service node, and the like are taken into account. Requirements for each service include transfer bandwidth, the upper bound of transfer latency, types and order of service functions to be received on the way. The above-mentioned physical resources are allocated in a way to satisfy such requirements.

In Non-patent document 1 and Non-patent document 2, although parameters taken into consideration are different, the objective is to minimize physical resources to allocate. In Patent document 1, network links and servers having greater numbers of residual resources (having lighter loads) are prioritized when allocated to a service so as to equalize the entire resource allocation.

RELATED ART DOCUMENTS

Non-Patent Documents

Patent document 1: Japanese Unexamined Patent Application Publication No. 2014-171056

Non-Patent Documents

Non-patent document 1: M. Yu et al., Rethinking Virtual Network Embedding: Substrate Support for path Splitting and Migration, ACM SIGCOMM Computer Communication Review, Vol. 38, No. 2, pp. 17-29, 2008

Non-patent document 2: M. Chowdhury et al., Vineyard: Virtual network embedding algorithms with coordinated node and link mapping, IEEE/ACM Trans. Networking, vol. 20, no. 1, pp. 206-219, 2012

SUMMARY OF INVENTION

Problem to be Solved by the Invention

Although conventional technologies disclosed in Non-patent document 1, Non-patent document 2, and Patent document 1 aim at minimization or equalization of resources to allocate, they do not necessarily lead to maximization of the number of services that can be provided. This is because there is likelihood that the conventional technologies cause fragmentation of remaining resources. Similar to fragmentation of a computer memory, fragmentation of remaining resources here is a state in which usable resources are scattered, and hence, contiguous resources cannot be obtained in accordance with a new service request. In such a state, even if there is a margin in the total amount of remaining resources, resources may not be allocated to a new service, and consequently, the resource use rate declines. In particular, in the case of minimizing the amount of resources to allocate, there is a tendency that the resource usage increases on specific paths, and fragmentation tends to occur. Although fragmentation can be prevented to a certain extent by equalizing resources to allocate, an optimal allocation may not necessarily be obtained.

In a computer memory, if fragmentation occurs, it is possible to increase usable vacant areas by relocating resources being used. Similar consideration has been made in virtual networks. However, since relocation of resources in a virtual network may lead to temporary discontinuance of network services, it is desirable to locate resources without necessity of relocation as much as possible.

The present invention has been made in view of the above respects, aiming at enabling allocation of resources that can avoid fragmentation of resources, and thereby, can hold many services in the physical network.

Means for Solving the Problem

Thereupon, in order to solve the above problems, a resource allocation device includes a searcher configured, in response to a use request for resources of a physical network, the use request having a pair of nodes as terminal points designated among a plurality of nodes constituting the physical network, to search for one or more candidate paths between the terminal points, with which amounts of the resources related to the use request can be allocated, in a state where the resources that have already been allocated to one or more other use requests are set aside from the physical network; a calculator configured to calculate, for each of the one or more searched-for candidate paths, in a state where the resources are allocated to the candidate path, for each of the one or more other existing use requests to which the resources have already been allocated, a maximum number of paths that can be allocated between the terminal points related to the use request; and a selector configured to select the candidate path with which a sum total of the maximum numbers of paths becomes greatest.

Advantage of the Invention

It is possible to enable allocation of resources that can avoid fragmentation of resources, and can accommodate many services in the physical network.

EMBODIMENTS OF THE INVENTION

Figure 1:
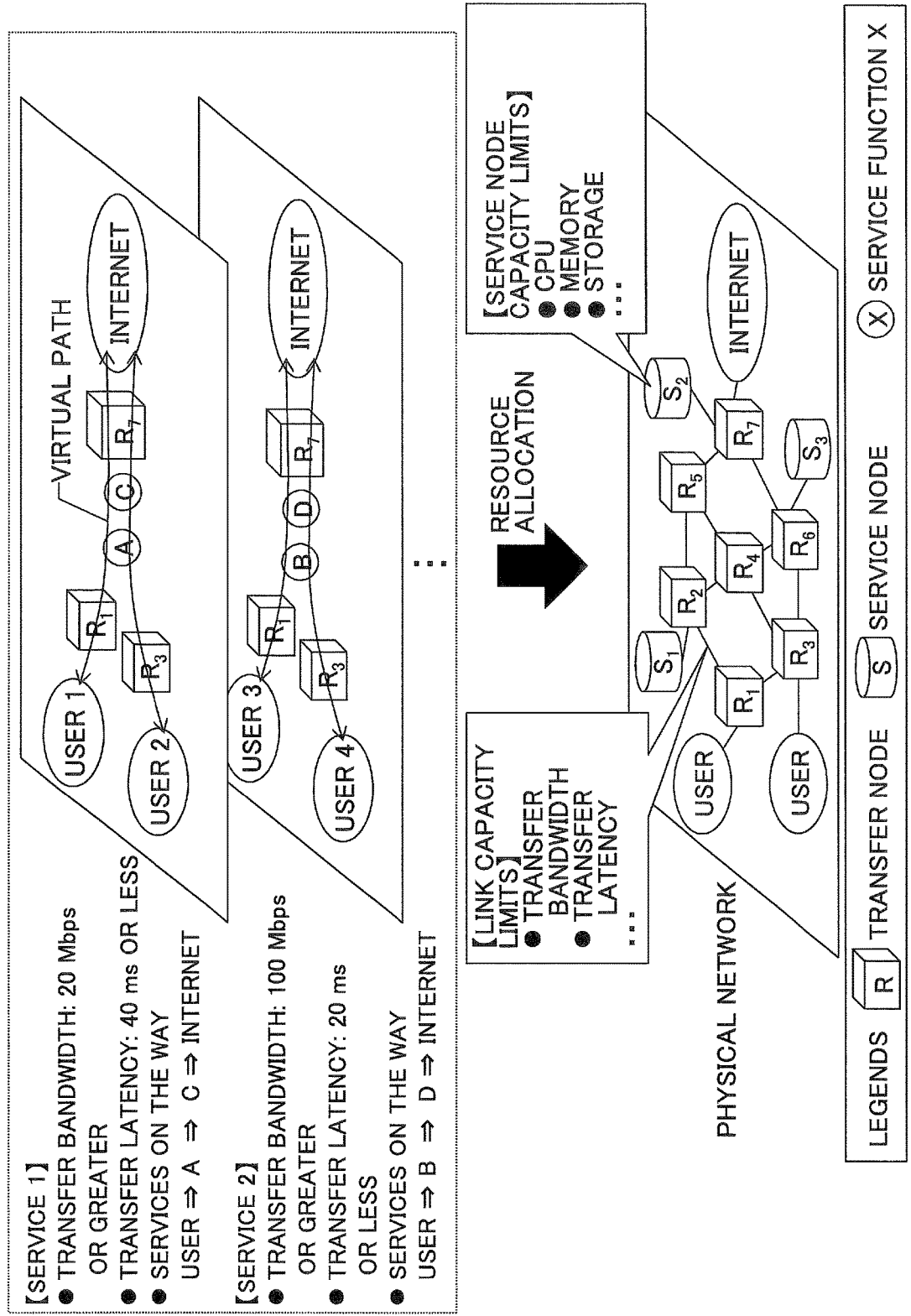
FIG. 1 is a diagram for illustrating an overview of an embodiment of the present invention.

In the following, embodiments will be described with reference to the drawings. FIG. 1 is a diagram for illustrating an overview of an embodiment of the present invention. In the present embodiment, suppose that multiple services are provided on a single physical network. As illustrated in the lower part in FIG. 1, a physical network is constituted with transfer nodes, service nodes to execute service functions, and links that connect the nodes. A transfer node is, for example, a router. A service node is, for example, one or more server computers.

Resources of the physical network allocated to services are divided into two types, namely, transfer-related resources and server-related resources. A transfer-related resource mainly indicates a resource of a link between transfer nodes in which the transfer bandwidth and the like specifically set for the link are taken into consideration. The transfer latency is set to each link in addition to the transfer bandwidth. A server-related resource indicates a resource of a service node in which CPU, memory capacity, storage capacity, and the like are specifically taken into consideration.

Meanwhile, as illustrated in the upper part in FIG. 1, requirements for providing a service, such as the transfer bandwidth, upper bound of transfer latency, service function, and the like are set in each service. The starting point and ending point of a service may be different for the same service depending on the user. For example, paths allocated should be different for a user in Tokyo and a user in Okinawa. Therefore, a "virtual path" is defined for each user of a service, as a path that includes designation of one of the pairs of nodes among multiple nodes constituting the physical network, in addition to the requirements for the service. Either a transfer node or a service node is selected as the starting point or the ending point. Resource allocation is executed in units of virtual paths. Requests for resource allocation to virtual paths arrive sequentially, and physical resources are allocated upon each request. In the present embodiment, for requests for resource allocation to virtual paths that arrive in time series, resource allocation is executed so as to prevent fragmentation of the resources and to improve the use efficiency.

Figure 2:
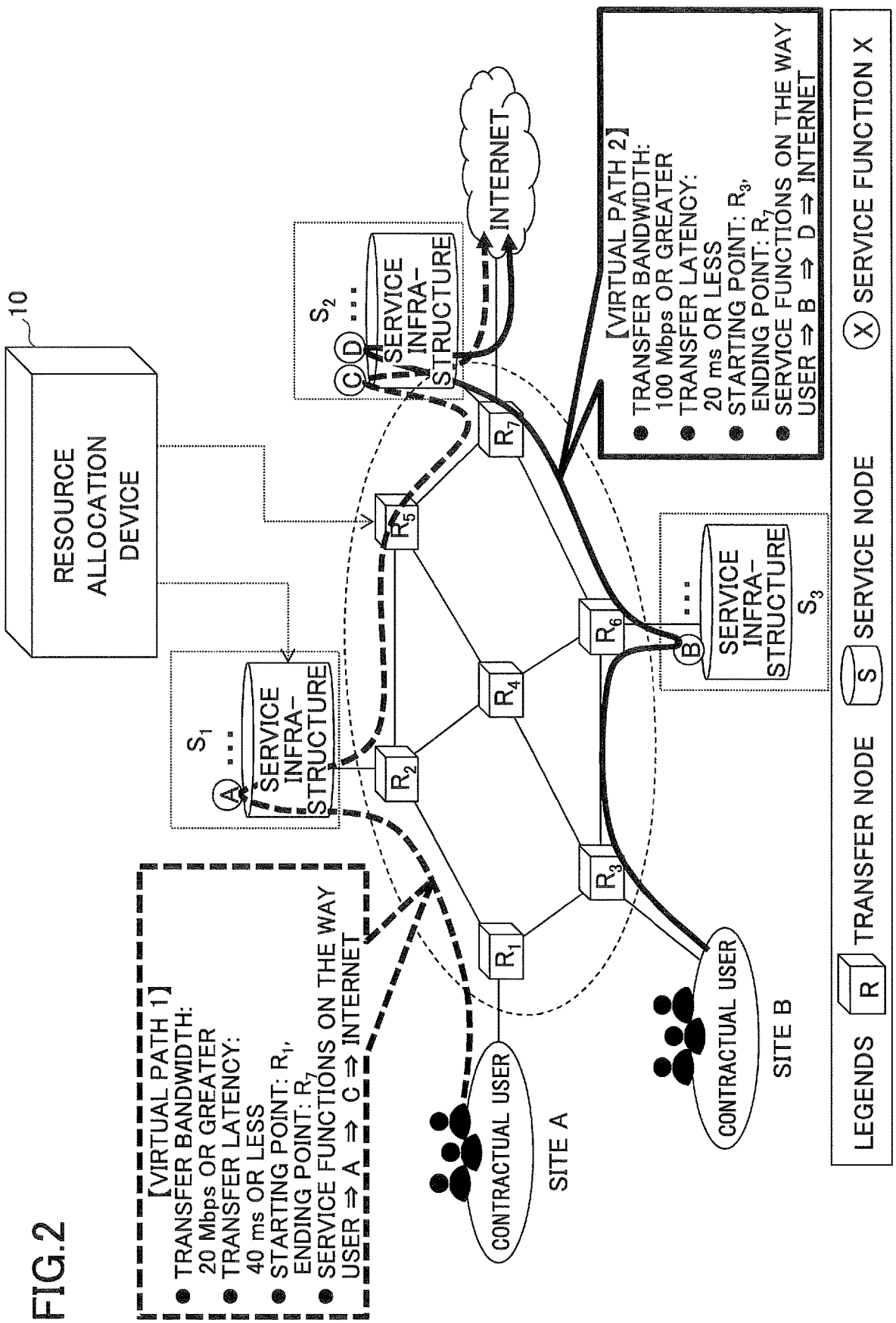
FIG. 2 is a diagram illustrating an example of a system configuration in an embodiment of the present invention.

FIG. 2 is a diagram illustrating an example of a system configuration in an embodiment of the present invention. As illustrated in FIG. 2, a system in the present embodiment includes a resource allocation device 10, multiple transfer nodes R ($R_1$ to $R_7$), and multiple service nodes S ($S_1$ to $S_3$).

Each of the transfer nodes R is provided with a function that is capable of controlling a transfer path of traffic by software, such as SDN (Software Defined Network), and the transfer path is controlled by the resource allocation device 10.

The service nodes S are commonly capable of executing service functions implemented by software, and the service functions can be executed on any of the service nodes. Management on which of the services is executed on which of the service nodes S is executed by the resource allocation device 10. Such management can be implemented by using a general NFV (Network Functions Virtualization), SFC (Service Function Chaining), or the like.

Figure 3:
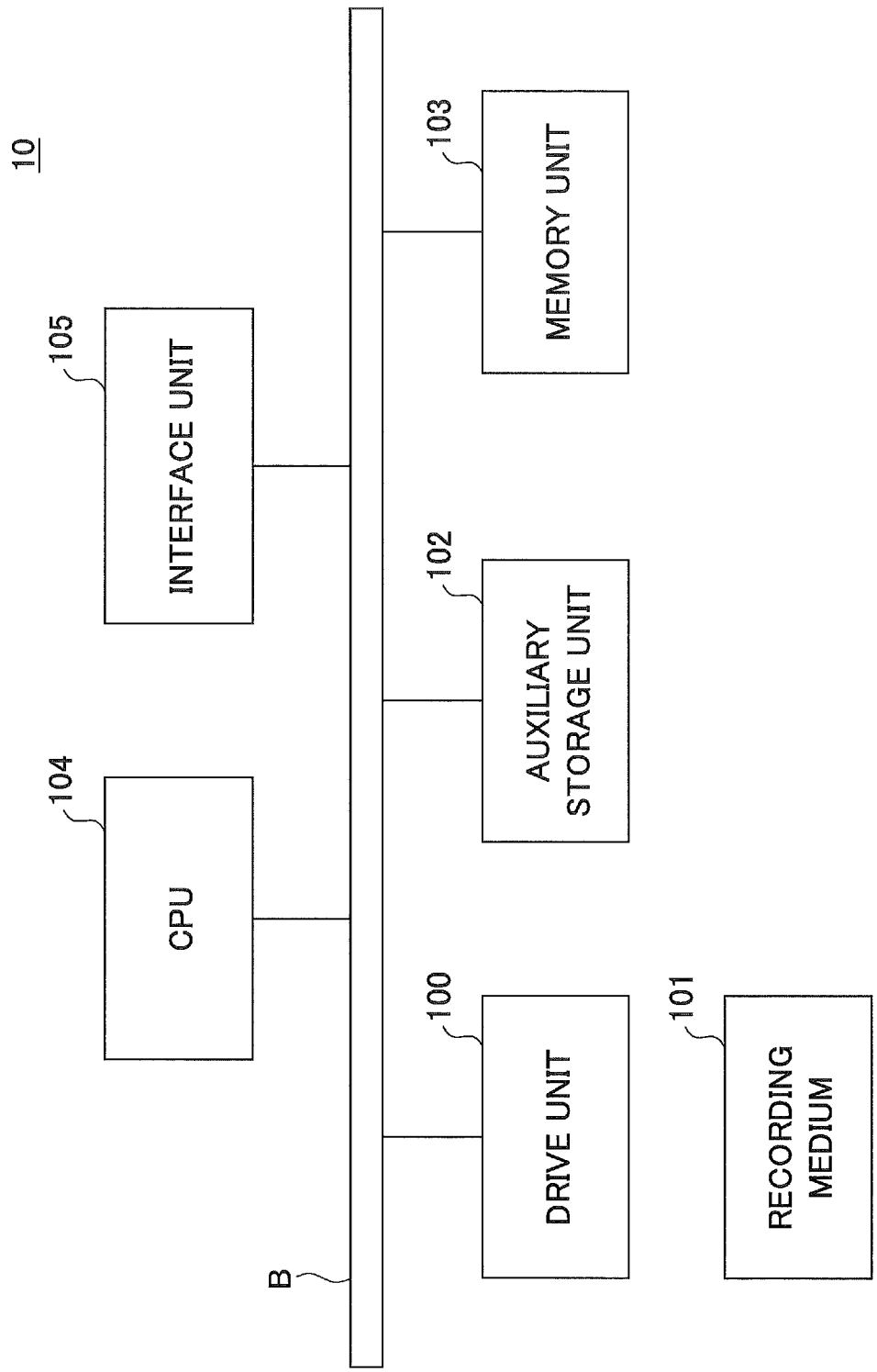
FIG. 3 is a diagram illustrating an example of a hardware configuration of a resource allocation device in an embodiment of the present invention.

FIG. 3 is a diagram illustrating an example of a hardware configuration of a resource allocation device in an embodiment of the present invention. The resource allocation device 10 in FIG. 3 includes a drive unit 100, an auxiliary storage unit 102, a memory unit 103, a CPU 104, and an interface unit 105, which are mutually connected by a bus B.

A program that implements processing on the resource allocation device 10 is provided with a recording medium 101 such as a CD-ROM. Once the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. The auxiliary storage unit 102 stores the installed program, and stores required files, data, and the like as well.

Upon receiving a command to activate the program, the memory unit 103 reads out the program from the auxiliary storage unit 102, to load the program. The CPU 104 executes a function related the resource allocation device 10, based on the program loaded in the memory unit 103. The interface unit 105 is used as an interface for connecting with a network.

Figure 4:
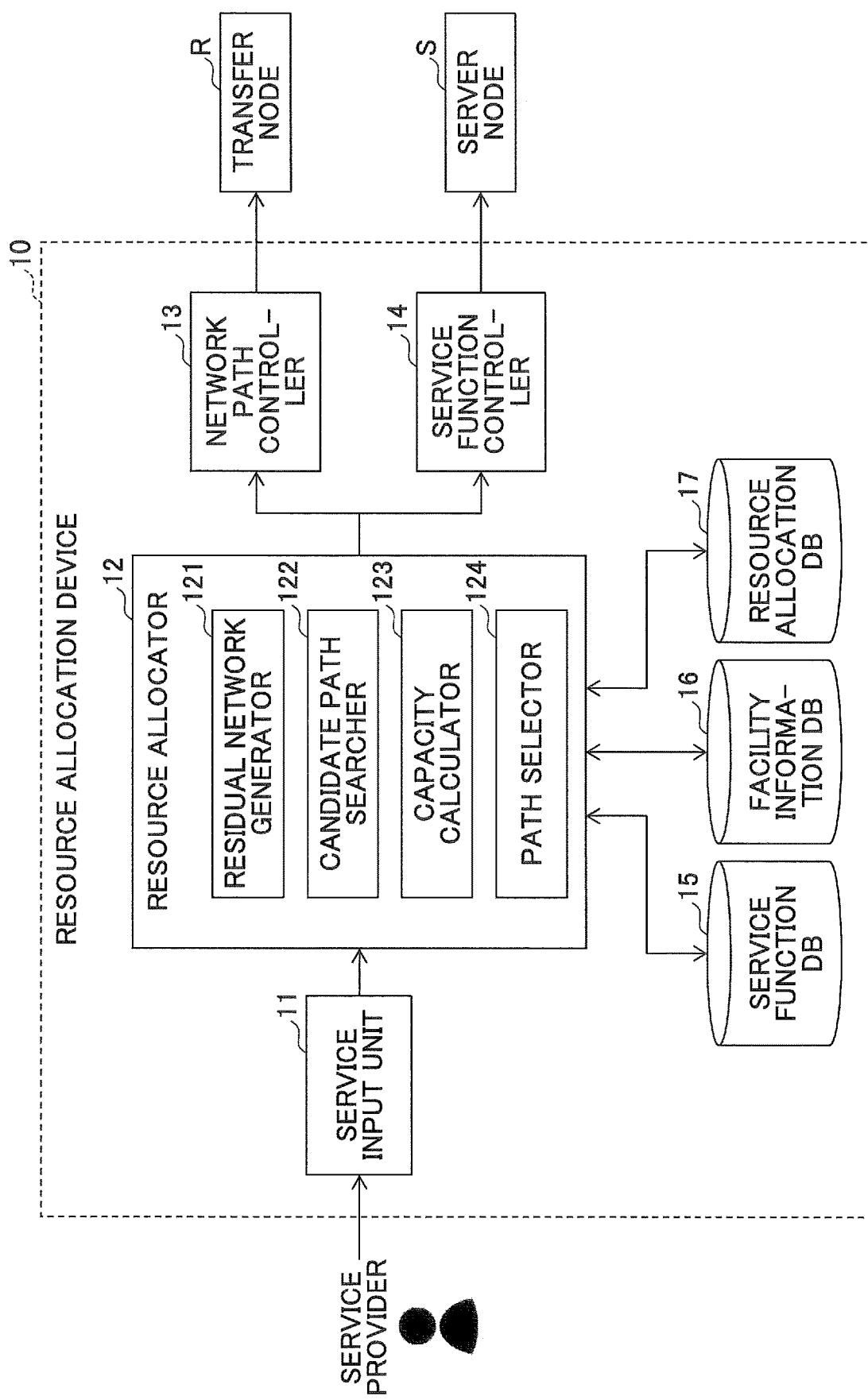
FIG. 4 is a diagram illustrating an example of a functional configuration of a resource allocation device in an embodiment of the present invention.

FIG. 4 is a diagram illustrating an example of a functional configuration of a resource allocation device in an embodiment of the present invention. In FIG. 4, the resource allocation device 10 includes a service input unit 11, a resource allocator 12, a network path controller 13, and a service function controller 14. These units are implemented by processes which one or more programs installed in the resource allocation device 10 cause the CPU 104 to execute. The resource allocation device 10 also utilizes databases including a service function DB 15, a facility information DB 16, and a resource allocation DB 17. These databases can be implemented, for example, by using the auxiliary storage unit 102 or a storage device or the like that can be connected to the resource allocation device 10 via a network.

The service input unit 11 newly receives input from an operator of a service provider that specifies requirements for a virtual path to which resources are allocated.

The resource allocator 12 allocates resources to the virtual path based on the new requirements for the virtual path and information stored in each of the service function DB 15, the facility information DB 16, and the resource allocation DB 17. A result of resource allocation is represented as a resource allocation path. In an example of a virtual path 1 in FIG. 2, the resource allocation path passes through "user=>$R_1$=>$R_2$=>$S_1$ (function A)=>$R_2$=>$R_5$=>$R_7$=>$S_2$ (function C)=>$R_7$=>Internet". The resource allocator 12 directs the network path controller 13 and the service function controller 14 to allocate resources based on the resource allocation path. Note that the resource allocator 12 includes a residual network generator 121, a candidate path searcher 122, a capacity calculator 123, and a path selector 124.

The network path controller 13 controls a path through the transfer nodes R based on the resource allocation path. The service function controller 14 controls the service nodes based on the resource allocation path. The network path controller 13 and the service function controller 14 interoperate to execute processing, and control transfer paths and execution of service functions based on paths allocated to respective virtual paths, to allocate physical resources.

The service function DB 15 stores, for each service function, the amounts of resources to be consumed by execution of the service functions (for example, for a function A, two cores of CPU, 1 GB of memory, and 10 GB of storage). The facility information DB 16 stores information on a physical network, including connection information (topological information) between the transfer nodes R and the service nodes S, the transfer bandwidth and transfer latency of each link, and the server capacity (the number of CPU cores, memory capacity, storage capacity, etc.). The resource allocation DB 17 stores, for each of the transfer-related resources (links) and the server-related resources (service nodes S), resource information that has already been allocated to existing virtual paths. For example, information representing an allocated bandwidth is stored for a transfer-related resource. Information representing an allocated server capacity is stored for a server-related resource.

Figure 5:
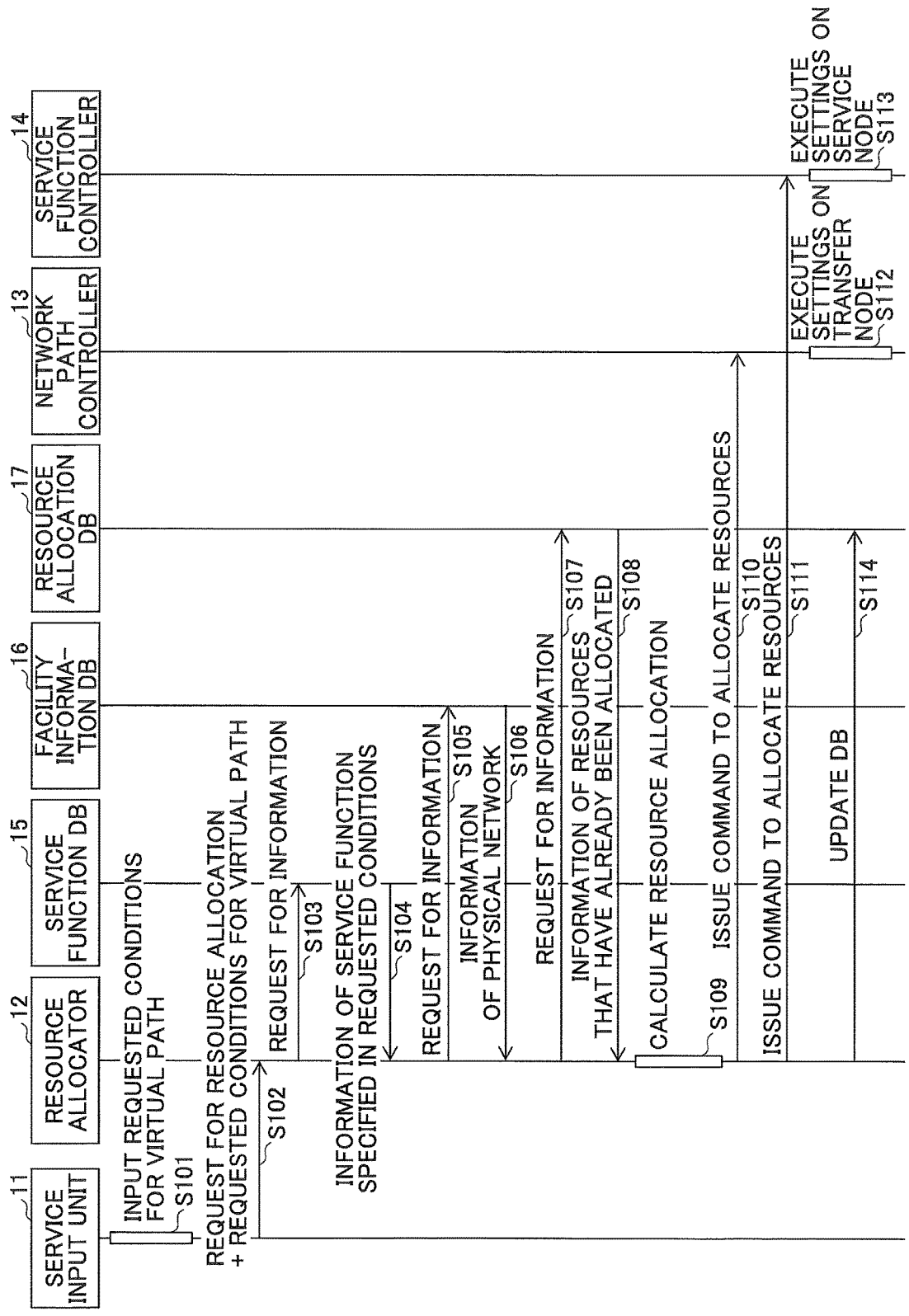
FIG. 5 is a sequence chart for illustrating an example of processing steps executed by a resource allocation device.

In the following, processing steps executed by the resource allocation device 10 will be described. FIG. 5 is a sequence chart for illustrating an example of processing steps executed by the resource allocation device.

For example, in response to newly receiving input of requirements related to a virtual path from an operator of a service provider (Step S101), the service input unit 11 makes a request for resource allocation based on the requirements to the resource allocator 12 (Step S102). Note that in the requirements, a transfer bandwidth, a transfer latency, a service function, and the like required for providing a service are designated. Also, a starting point and an ending point of a service are designated in a virtual path for the user of the service.

The resource allocator 12 reads out required information from the DBs in response to the request. The amounts of resources consumed by the service designated in the requirements (the number of CPU cores, memory capacity, storage capacity, and the like) are obtained from the service function DB (Steps S103 and S104). Information on the physical network, including connection information (topological information) between the transfer nodes R and the service nodes S, the transfer bandwidth and transfer latency of each link, the server capacity, and the like, is obtained from facility information DB 16 (Steps S105 and S106). Information on resources that have already been allocated to existing virtual paths is obtained from the resource allocation DB 17 (Steps S107 and S108).

Next, based on the requirements for the virtual path and the information obtained from the DBs, the resource allocator 12 calculates a resource allocation path (Step S109). Next, the resource allocator 12 directs each of the network path controller 13 and the service function controller 14 to allocate resources based on the calculated resource allocation path (Steps S110 and S111).

The network path controller 13 executes settings on transfer nodes R related to the resource allocation path (Step S112). Specifically, a path setting (a routing setting) is executed on the transfer node R for forming the resource allocation path. Also, the service function controller 14 executes settings on service nodes S related to the resource allocation path (Step S113). For example, on the service node S, a setting is executed that enables to provide the service function (for example, activation of the service function or the like). The resource allocator 12 also updates the content of the resource allocation DB 17, based on the resource allocation path (Step S114). For example, the transfer bandwidth of a link related to the resource allocation path may be decreased, and the server capacity of the service node S related to the resource allocation path may be decreased.

Next, Step S109 will be described in detail.

A path to be allocated to a new virtual path by the resource allocator 12 is selected so as to prevent fragmentation of the resources as much as possible, and to maximize the amount of usable remaining resources. Specifically, a path to be allocated is selected so as to maximize the total number of virtual paths to which resources can be allocated for existing services in the physical network (referred to as "service capacity", below) if the designated resources are allocated to the new virtual path. In other words, as a path to be allocated to the new virtual path, a path that would not be used by other services is selected as much as possible. Consequently, it becomes possible to hold a greater number of contiguous resources available for the services as a whole, and the expected value of the number of services to be held can be increased more than in the conventional technologies.

Figure 6:
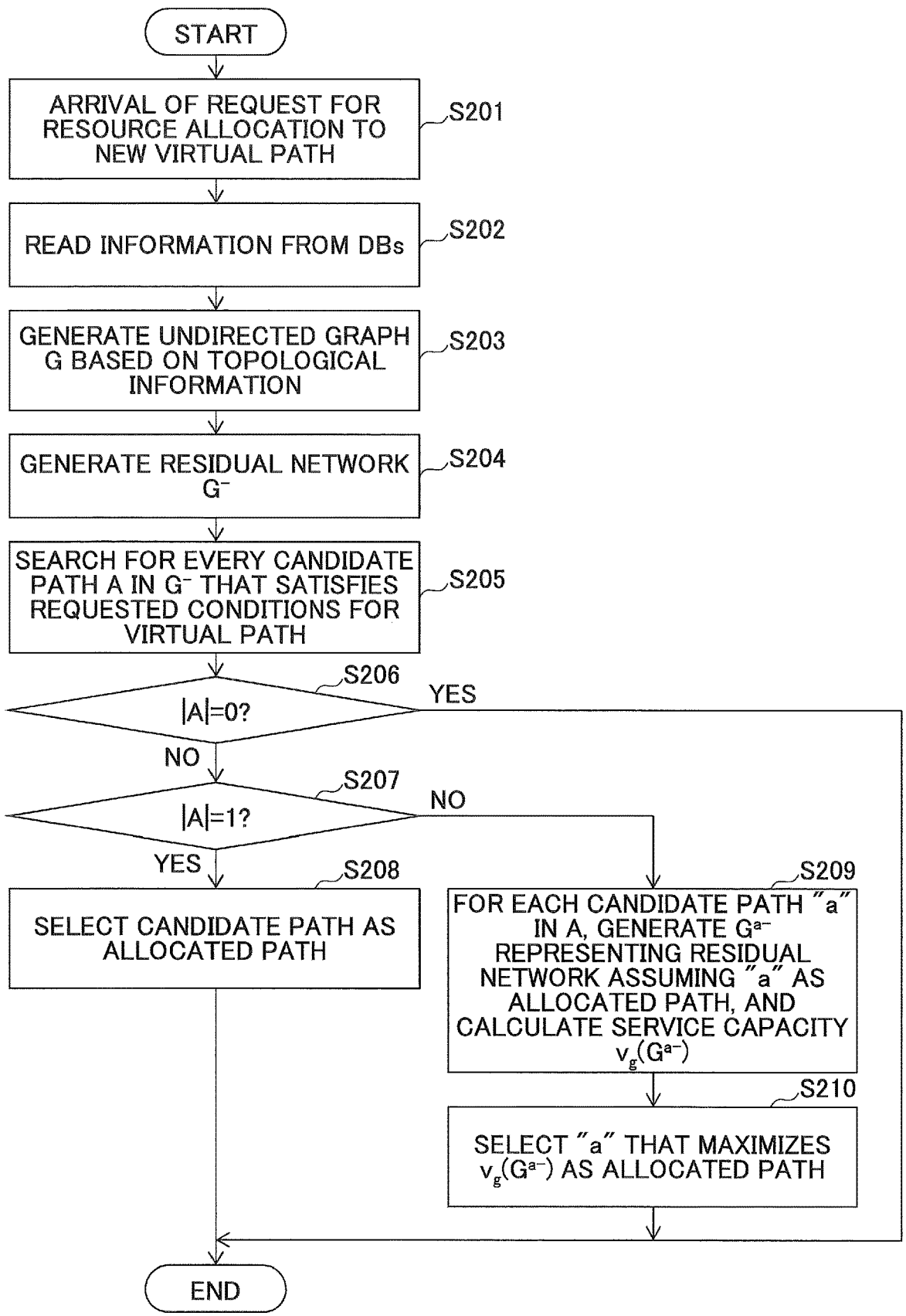
FIG. 6 is a flowchart for illustrating an example of processing steps of calculation of resource allocation.

FIG. 6 is a flowchart for illustrating an example of processing steps of calculation of resource allocation.

Once a request for a new virtual path has come from the service input unit 11 at Step S201, the residual network generator 121 reads out required information from the DBs (Step S202). The content of Step S202 is as having described with Steps S103-S108 in FIG. 5.

Next, the residual network generator 121 generates a weighted, undirected graph G (referred to as the "network G", below) based on topological information on a physical network obtained from the facility information DB 16 (Step S203). For each edge in the network G, a transfer latency obtained from the facility information DB 16 is assigned as the weight. A capacity constraint (transfer bandwidth) obtained from the facility information DB 16 for each link is also set to each of the edges.

Next, the residual network generator 121 generates a virtual network from the network G (referred to as the "residual network G⁻", below), in which the resource capacity that has already been allocated to existing virtual paths (for which the requests have arrived before the arrival of the request for the new virtual path, and currently uses the resources) is deducted (Step S204). In other words, the residual network G⁻ is a network that represents a state of the network G in which the resource capacity that has already been allocated to existing virtual paths is set aside. Note that the resource capacity that has already been allocated can be identified based on information obtained from the resource allocation DB 17.

Next, the candidate path searcher 122 searches for every candidate path A that satisfies the requirements for the virtual path in the residual network G⁻ (Step S205). In other words, every path to which the amounts of resources related to the requirements between the starting point and the ending point of the virtual path (between the terminal points) can be allocated, is searched for as the candidate path A. Note that such search for the candidate paths A can be executed by using any well-known algorithm.

Next, the candidate path searcher 122 determines whether the number of the candidate paths A or |A| is 0 (Step S206). If |A| is 0 (YES at Step S206), allocation fails because there is no allocatable path.

If |A| is greater than or equal to 1 (NO at Step S206), the resource allocator 12 determines whether |A| is 1 (Step S207). If |A| is 1 (YES at Step S207), the resource allocator 12 selects the one candidate path that has been found as the resource allocation path (Step S208).

On the other hand, if |A| is greater than or equal to 2 (NO at Step S207), the resource allocator 12 selects an optimal path from among the candidate paths A at Steps S209 and S210.

Here, service capacity in the network G, or v(G) is defined. The service capacity is a measure to represent how many of existing services can be held in a certain network G. The service capacity of the entire network is defined as the sum total of the capacity $v_s(G,s)$ of each service s.

$$v_g(G) = \Sigma_{s \in S} v_s(G,s)$$

where S represents a set of existing services provided on the network G; and $v_s(G,s)$ represents the capacity of an individual service s, which is defined as a value obtained by multiplying a maximum number of virtual paths that can be held for the service in the network G, by the weight of the service s.

$$v_s(G,s) = \Sigma_{(x,y) \in Ns} W_{x,y,s} \times \text{maxpass}(G,x,y,s)$$

where Ns represents a set (starting point, ending point) of virtual paths in the service s; and maxpass(G,x,y,s) represents a maximum number of virtual paths that can be held between the starting point x and the ending point y of a certain virtual path with respect to the service s. The maximum number of virtual paths can be obtained by solving a well-known problem called the maximum flow problem. For example, if there is one virtual path for a certain service s, the maximum number of paths that can be held between the starting point and the ending point of the virtual path is the maximum number of virtual paths. Although the number of paths that can be held between the starting point and the ending point may differ depending on a method for allocating paths, the maximum number of virtual paths corresponds to the number of paths obtained by a method for allocating paths that gives a maximum number of paths that can be held, among all methods for allocating paths. Note that $w_{x,y,s}$ is a weight that depends on the importance of a service and a path.

At Step S209, for each candidate path a∈A in the residual network G⁻, the capacity calculator 123 generates a residual network $G^{a-}$ in the case that resources are allocated to the candidate path a, to calculate the capacity $v_g(G^{a-})$ with respect to the residual network $G^{a-}$. In other words, for every candidate path a, the capacity $v_g(G^{a-})$ is calculated in a state where resources are allocated to the candidate path a in the residual network G. Note that the capacity $v_g(G^{a-})$ with respect to the residual network $G^{a-}$ represents the sum total of the capacity $v_s(G^{a-},s)$ for every existing virtual path in the residual network $G^{a-}$. Therefore, at Step S209, for each candidate path a, the capacity $v_s(G^{a-},s)$ is calculated for each existing virtual path, and further, the capacities $v_s(G^{a-},s)$ are summed up to calculate $v_g(G^{a-})$.

Next, the path selector 124 selects a candidate path a with which the capacity $v_g(G^{a-})$ becomes the maximum as the resource allocation path (Step S210). If there are multiple candidate paths a having the same value of $v_g(G^{a-})$, a candidate path with which the transfer latency of the virtual path becomes the minimum may be selected if QoS (Quality of Service) is considered to be important; or a candidate path with which the path length becomes the minimum may be selected if the resource consumption is considered to be important.

Figure 7:
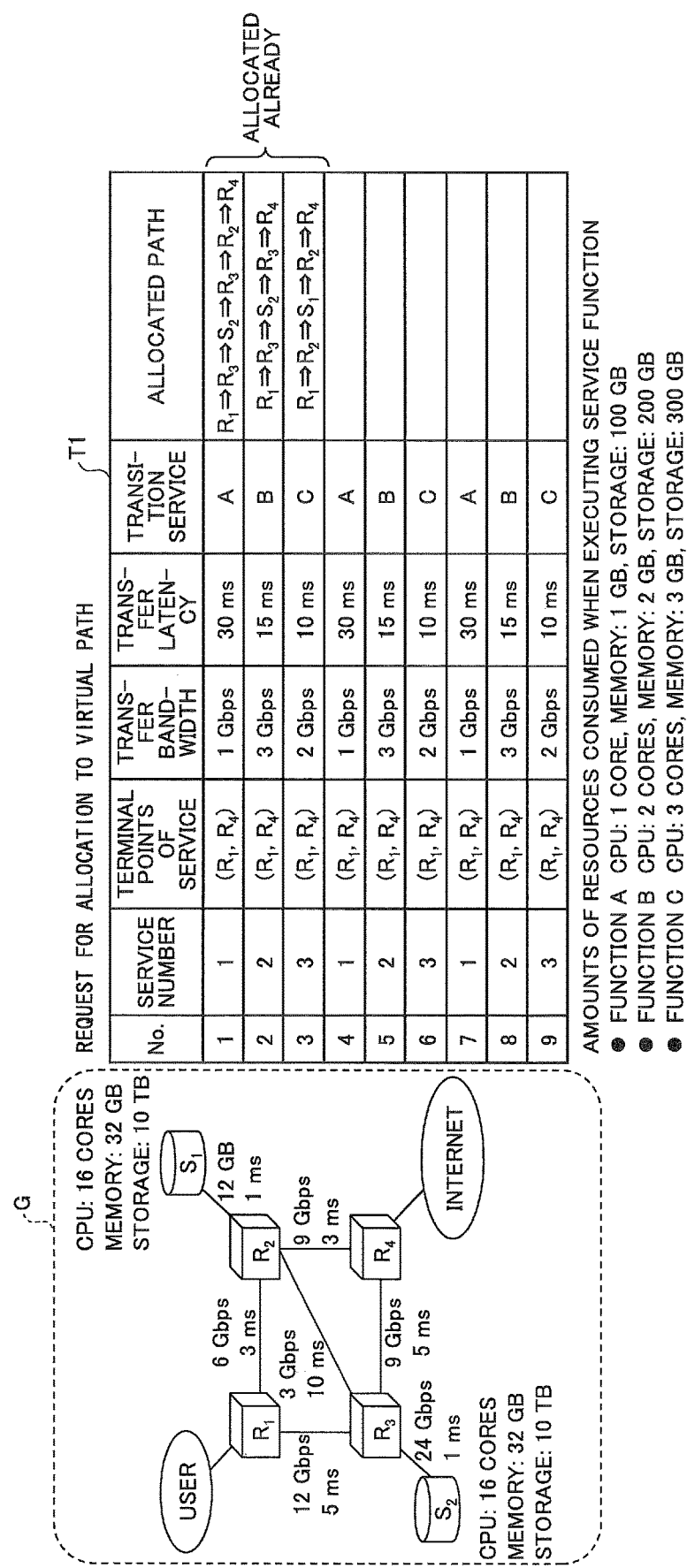
FIG. 7 is a diagram for illustrating a specific example of an embodiment of the present invention.

Next, a specific example of the present embodiment will be described. FIG. 7 is a diagram for illustrating a specific example of an embodiment of the present invention.

As illustrated on the left side in FIG. 7, suppose that a simple physical network G is given. Three types of services (service numbers) are available, and requirements of the services are as follows: for a service 1, the required transfer bandwidth is 1 Gbps, the required transfer latency is 30 ms, and the service function on the way is A; for a service 2, the required transfer bandwidth is 3 Gbps, the required transfer latency is 15 ms, and the service function on the way is B; and for a service 3, the required transfer bandwidth is 2 Gbps, the required transfer latency is 10 ms, and the service function on the way is C. The resource usage consumed when executing the service functions are: one core of CPU, 1 GB of memory, and 100 GB of storage for the function A; two cores of CPU, 2 GB of memory, and 200 GB of storage for the function B; and three cores of CPU, 3 GB of memory, and 300 GB of storage for the function C. Suppose that contents of the requirements for virtual paths are as illustrated in Table T1, and requests for resource allocation to virtual paths for the services 1, 2, and 3 arrive serially and repeatedly.

Note that in Table T1, the virtual paths having No. 1 to 3, have resources allocated already.

Figure 8:
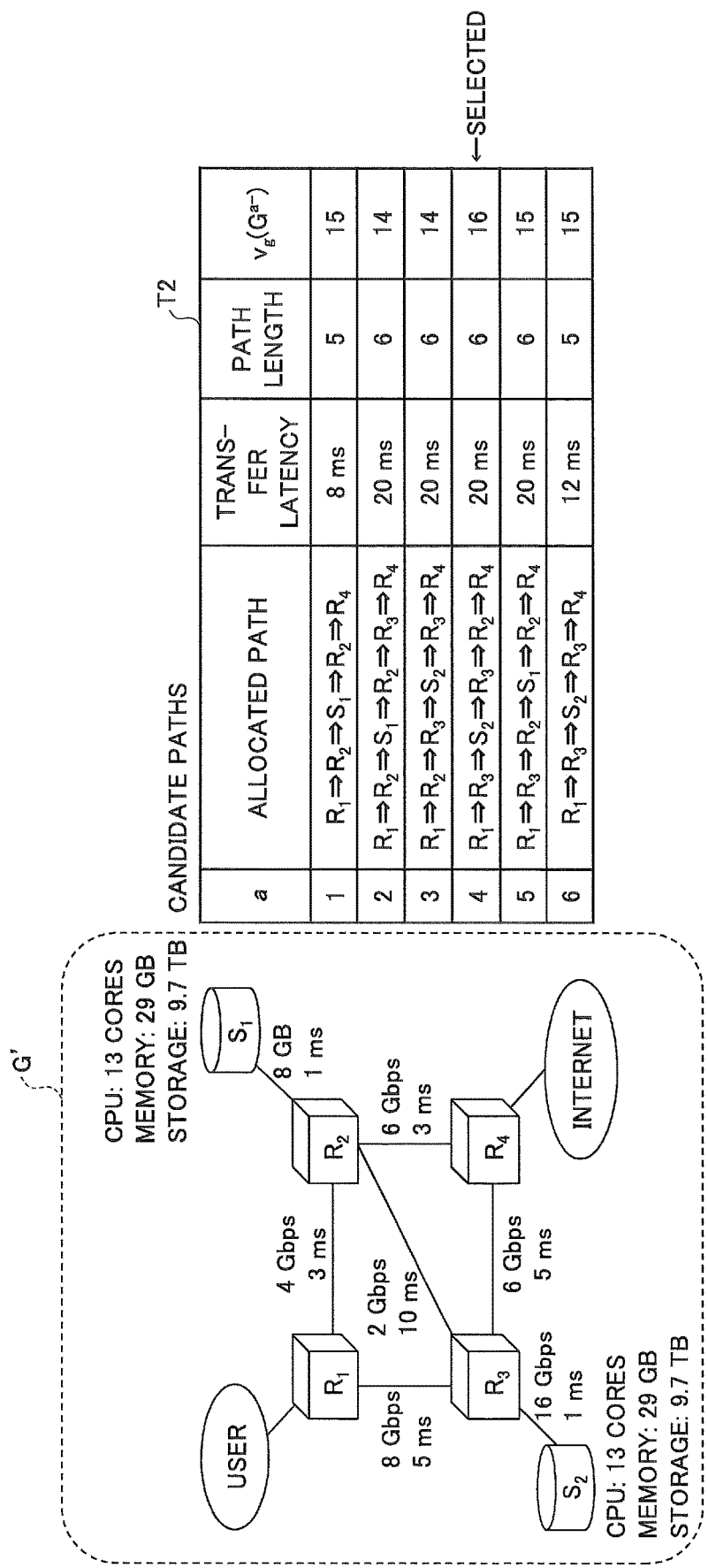
FIG. 8 is a diagram illustrating an example of resource allocation to a virtual path 4 in a residual network.

As an example of execution of an algorithm, a case will be described in which resources are allocated to a virtual path 4 (a virtual path indicated with No. 4 in Table T1). The residual network G' in which resources that have been allocated to existing virtual paths are deducted from the physical network G is as illustrated in FIG. 8. In the residual network G', candidate paths to be allocated to the virtual path 4 are six paths listed in Table T2. Calculating the service capacity $v_g(G^{a-})$ for each of the paths (assuming every weight $w_{x,y,s}$ set to 1) singles out the candidate path 4 of a=4 as the candidate path with which the service capacity $v_g(G^{a-})$ becomes the maximum. Therefore, in this case, the candidate path 4 is selected as the resource allocation path with respect to the virtual path 4.

Next, under the network conditions illustrated in FIG. 7, allocatable numbers of virtual paths are compared among an algorithm for minimizing resource usage, an algorithm for equalizing resource use rate, and the algorithm of the present embodiment.

In the algorithm for minimizing resource usage, a candidate path with which the resource usage becomes the minimum is selected from among the candidate paths. If multiple candidate paths exist, one having the shorter transfer latency is selected.

In the algorithm for equalizing resource use rate, a candidate path is selected so as to equalize use rates (to minimize variance of use rates) of all the resources. If multiple candidate paths exist, one having the shorter transfer latency is selected as in the algorithm for minimizing resource usage.

For the above three algorithms, the respective numbers of allocatable virtual paths are compared in the case where resource allocation is executed sequentially starting from the virtual path 1 in Table T1. If the resource allocation fails halfway through, allocation to the virtual path is given up, and resource allocation to the next virtual path will be executed. Therefore, under this condition, the number of virtual paths to be allocated is nine at most.

Figure 9:
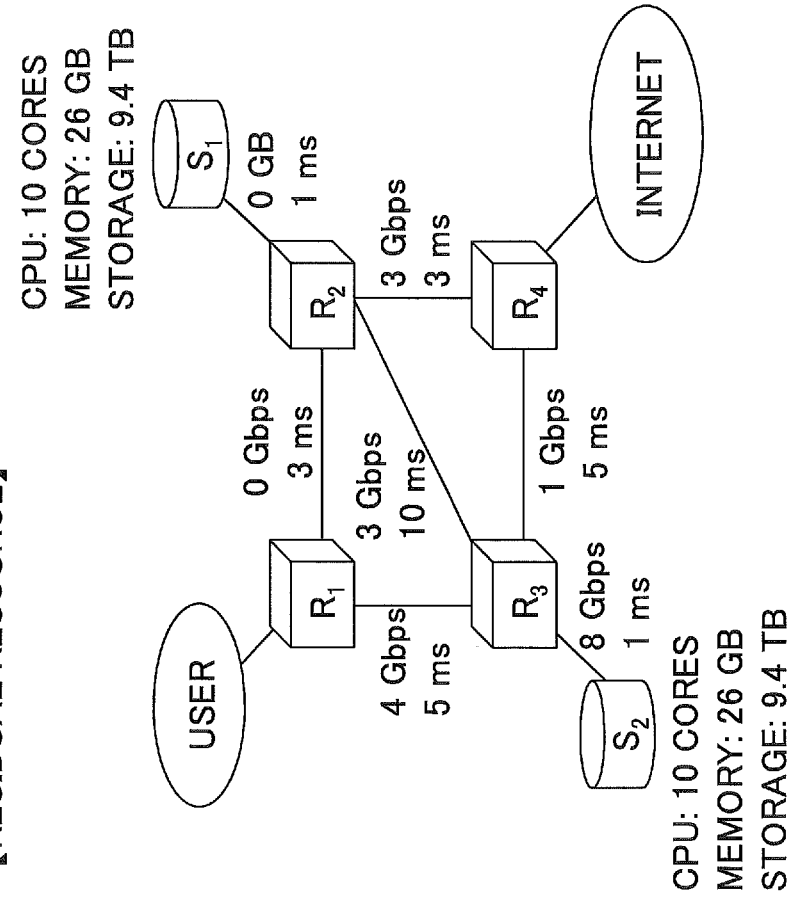
FIG. 9 is a diagram illustrating a result of resource allocation obtained by an algorithm for minimizing resource usage.
Figure 10:
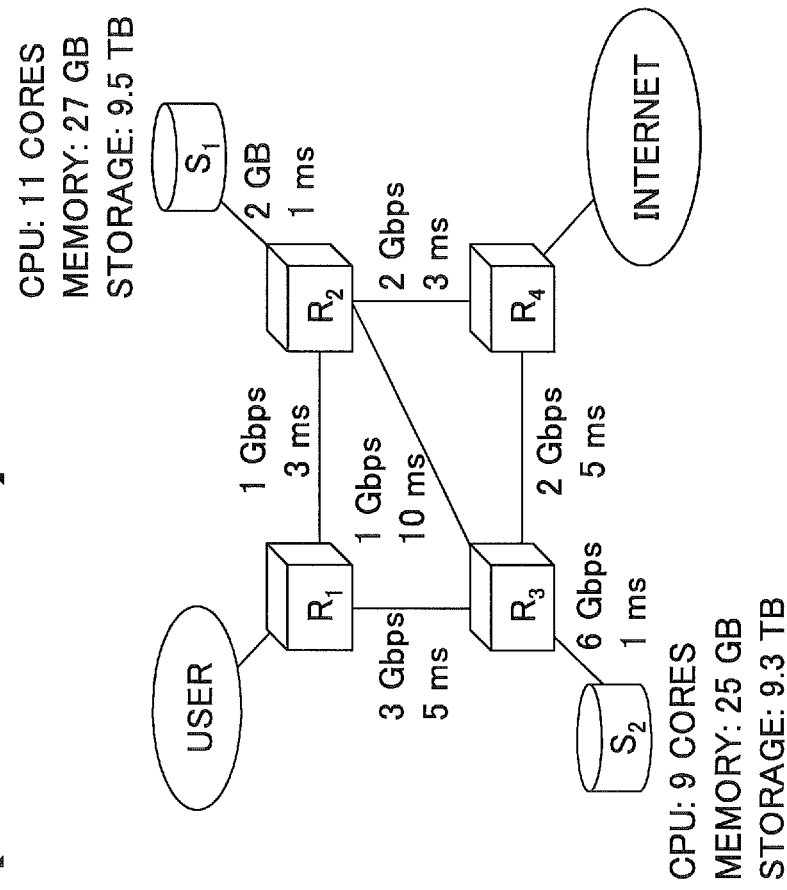
FIG. 10 is a diagram illustrating a result of resource allocation obtained by an algorithm for equalizing resource use rate.
Figure 11:
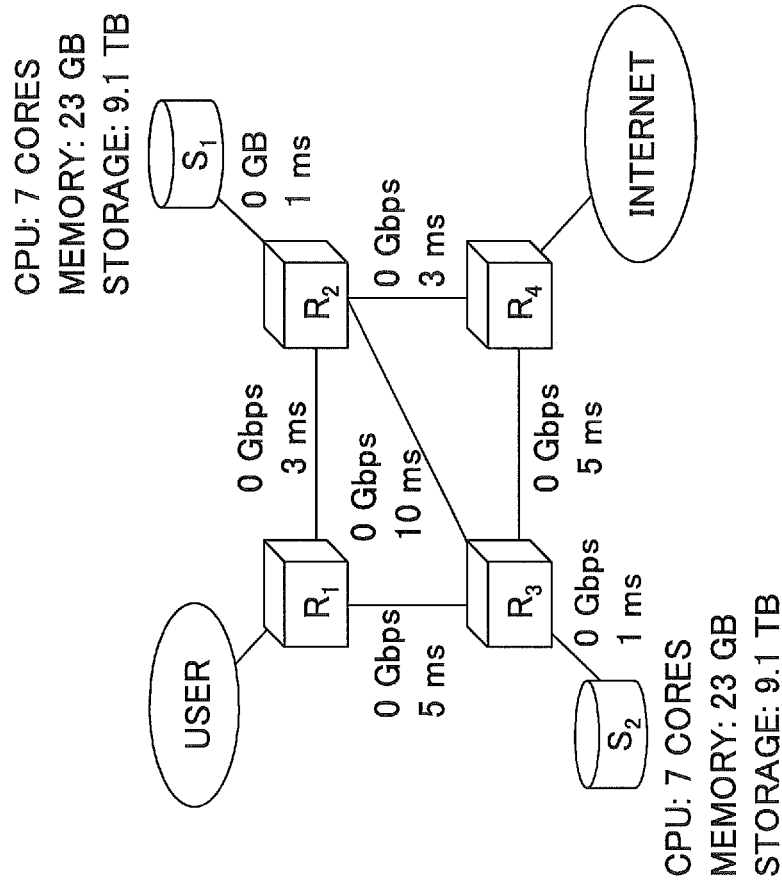
FIG. 11 is a diagram illustrating a result of resource allocation obtained by an algorithm of an embodiment.

FIG. 9 is a diagram illustrating a result of resource allocation obtained by the algorithm for minimizing resource usage. FIG. 10 is a diagram illustrating a result of resource allocation obtained by the algorithm for equalizing resource use rate. FIG. 11 is a diagram illustrating a result of resource allocation obtained by the algorithm of the present embodiment.

Comparing the numbers of virtual paths to which the resource allocation has succeeded by the respective algorithms, which are seven for the algorithm for minimizing resource usage; seven for the algorithm for equalizing resource use rate; and nine for the algorithm of the present embodiment, the present embodiment turns out to be the most superior. Also, the network resource consumption rates are 74.7% for the algorithm for minimizing resource usage; 77.3% for the algorithm for equalizing resource use rate; and 100% for the present embodiment. Thus, the present embodiment can utilize the resources effectively. Meanwhile, the average transfer latency per path is 10.3 ms for the algorithm for minimizing resource usage; 13.1 ms for the algorithm for equalizing resource use rate; and 13.3 ms for the present embodiment. Thus, it is understood that the present embodiment allocates a path that is more roundabout than the conventional technologies.

From the above results, it is understood that the present embodiment deliberately allocates a roundabout path, which would not be used by the other services, to a virtual path having a longer required transfer latency so that virtual paths having shorter required transfer latencies tend to be passed through, and thereby, a greater number of virtual paths can be held. Meanwhile, in the case of using the algorithm for minimizing resource usage or the algorithm for equalizing resource use rate, such consideration is not taken, and resources are allocated in accordance with respective objective, which causes fragmentation of the resources and existence of virtual paths that cannot be held. Specifically, since resources on the shortest path between $R_1$ and $R_4$ have been allocated to virtual paths having longer required transfer latencies (service 2 and service 3), resources cannot be allocated to a virtual path having a shorter required transfer latency (service 1).

Even if the order of requests for the virtual paths changes, by using the present embodiment, the number of virtual paths to which resource allocation succeeds is always nine the greatest, and thus, a stable result can be derived regardless of conditions. Note that when using the other algorithms, the number of allocatable virtual paths varies depending on the order.

As described above, according to the present embodiment, when allocating physical resources to services in a virtual network, it is possible to prevent fragmentation of the resources as much as possible, and to maximize the amount of usable remaining resources. In other words, the present embodiment enables resource allocation by which fragmentation of resources of a physical network can be avoided. For example, it is possible to maximize an expected value of the number of services to be held in future, and to make the number of services to be held greater than those obtained by the conventional technologies. Consequently, a network provider can raise investment efficiency of facilities.

Note that in the present embodiment, a service request or a virtual path is an example of a use request for resources of a physical network; the candidate path searcher 122 is an example of a searcher; the capacity calculator 123 is an example of a calculator; and the path selector 124 is an example of a selector.

As above, the embodiments of the present invention have been described in detail. Note that the present invention is not limited to such specific embodiments, but various variations and modifications may be made within the scope of the subject matters of the present invention described in the claims.

The present patent application claims priority based on Japanese Patent Application No. 2015-222640 filed on Nov. 13, 2015, and entire contents of the Japanese Patent Application are incorporated herein by reference.

LIST OF REFERENCE SYMBOLS 10 resource allocation device
11 service input unit
12 resource allocator
13 network path controller
14 service function controller
15 service function DB
16 facility information DB
17 resource allocation DB
100 drive unit
101 recording medium
102 auxiliary storage unit
103 memory unit
104 CPU
105 interface unit
121 residual network generator
122 candidate path searcher
123 capacity calculator
124 path selector
B bus

The invention claimed is:
1. A resource allocation device comprising:
processing circuitry configured to
in response to a use request for resources of a physical network, the use request having a pair of nodes as terminal points designated among a plurality of nodes constituting the physical network, search for one or more candidate paths between the terminal points, with which amounts of available resource usage related to the use request can be allocated, in a state where amounts of resource usage that has already been allocated to one or more other use requests are set aside from available resource usage;

determine a number of candidate paths that are available between the terminal points; and wherein when a number of candidate paths that are available is zero, determine that there is no allocatable path for the use request, when there is only one candidate path available, select the one candidate path as the allocated path for the use request, and when there are more than one candidate paths available, perform a calculation, for each of the one or more searched-for candidate paths, in a state where the resources are allocated to the candidate path, for each of one or more other existing services, a maximum number of paths that can potentially be allocated between the terminal points after the resources are allocated to the candidate path, and select the candidate path for which the calculation of the maximum number of paths becomes greatest as the allocated path for the use request.

2. The resource allocation device as claimed in claim 1, wherein the processing circuitry calculates, for each of the one or more existing services to which the resources have already been allocated, a value obtained by multiplying the maximum number of paths that can be allocated between the terminal points of the virtual path related to the service, by a weight corresponding to the use request.

3. A resource allocation method executed by a computer, the method comprising:

a searching step, in response to a use request for resources of a physical network, the use request having a pair of nodes as terminal points designated among a plurality of nodes constituting the physical network, to search for one or more candidate paths between the terminal points, with which amounts of available resource usage related to the use request can be allocated, in a state where amounts of resource usage that has already been allocated to one or more other use requests are set aside from available resource usage;

a determining step to determine a number of candidate paths that are available between the terminal points; and wherein when a number of candidate paths that are available is zero, determining that there is no allocatable path for the user request, when there is only one candidate path available, selecting the one candidate path as the allocated path for the use request, and when there are more than one candidate paths available, performing a calculating step to calculate, for each of the one or more searched-for candidate paths, in a state where the resources are allocated to the candidate path, for each of one or more other existing services, a maximum number of paths that can potentially be allocated between the terminal points after the resources are allocated to the candidate path, and performing a selecting step to select the candidate path for which the calculation of the maximum number of paths becomes greatest as the allocated path for the use request.

4. The resource allocation method as claimed in claim 3, wherein the calculating step calculates, for each of the one or more existing services to which the resources have already been allocated, a value obtained by multiplying the maximum number of paths that can be allocated between the terminal points of the virtual path related to the service, by a weight corresponding to the use request.

5. The resource allocation device as claimed in claim 1, wherein the plurality of nodes includes at least one server device and at least one router.

6. The resource allocation device as claimed in claim 5, wherein the amounts of the resources related to the use request is based on a processing capability and memory capacity at each of the at least one server device and an available transfer bandwidth and latency between each of the connections among the plurality of nodes.

7. The resource allocation device as claimed in claim 1, wherein the maximum number of paths that can be allocated between the terminal points of a virtual path is based on a service capacity of the physical network, which is a measure to represent how many of existing services can be held in the physical network, the service capacity of the physical network being defined as a sum total of the capacity $v_s(G,s)$ of each service s as follows:

$$v_g(G) = \Sigma_{s \in S} v_s(G,s)$$

wherein S represents a set of existing services provided on the physical network G; and $v_s(G,s)$ represents the capacity of an individual service s, which is defined as a value obtained by multiplying a maximum number of virtual paths that can be held for the service in the physical network G, by the weight of the service s, as follows:

$$v_s(G,s) = \Sigma_{(x,y) \in Ns} W_{x,y,s} \times \mathrm{maxpass}(G,x,y,s)$$

where Ns represents a set of terminal points, including a starting point and an ending pint, of virtual paths in the service s; and maxpass(G,x,y,s) represents a maximum number of virtual paths that can be held between the starting point x and the ending point y of a certain virtual path with respect to the service s, and the candidate path with which the sum total of the maximum numbers of paths becomes greatest is the candidate path which has a maximum value for $v_g(G)$.

* * * * *